Aug. 7, 1951     G. SIPKIN ET AL     2,562,957
SHIP'S RUBBER TIRE FENDER

Filed July 6, 1948     2 Sheets-Sheet 1

INVENTORS
GEORGE SIPKIN
BY    EARL B. AMEY

ATTORNEY

Aug. 7, 1951  G. SIPKIN ET AL  2,562,957
SHIP'S RUBBER TIRE FENDER

Filed July 6, 1948  2 Sheets-Sheet 2

INVENTORS
GEORGE SIPKIN
BY EARL B. AMEY

ATTORNEY

Patented Aug. 7, 1951

2,562,957

UNITED STATES PATENT OFFICE 2,562,957

SHIP'S RUBBER TIRE FENDER

George Sipkin and Earl B. Amey,
Washington, D. C.

Application July 6, 1948, Serial No. 37,175

8 Claims. (Cl. 114—219)

(Granted under the act of March 3, 1883, as
amended April 30, 1928; 370 O. G. 757)

The present invention relates to a ship's rubber tire fender, and more particularly to a ship's fender which will prevent rubbing and scuffing between two ships which are secured side by side, or between a ship and a pier.

Heretofore, ship's fenders have been composed of bundles of hemp, cocoa matting, or even short sections of wood bound together. Those composed of hemp are very costly and in times of war, or stress, may not be available at all, while cocoa matting, on the other hand, becomes crushed and broken due to the constant chafing between ships. The wood sections are likewise unsatisfactory in that they are so hard they scratch the paint from the ship's hull, or may even damage the hull itself.

Rubber fenders, constructed from discarded automobile tires, have been employed in the past also but they have not proved very satisfactory for the reason that they were excessively large and became very heavy when water-soaked, as for example the fender of P. F. Blackman, Patent No. 2,413,210, issued on December 24, 1946. In the patented device, the tires are bound together by means of two steel cables threaded through them, and which are crossed at right angles over the ends to form a stack, the middle portion of the stack being filled by means of a canvas bag containing cork, kapok, or other buoyant materials to give the entire device buoyancy, additional buoyancy being obtained by means of the air pockets formed in the large toroidal portion of the tires. As has been stated previously, this type of rubber fender has a number of unsatisfactory features; namely, that the canvas bag and its cork filler, as well as the tires themselves, readily absorb a great deal of water so that the whole device becomes excessively heavy, and also that the cork filler soon becomes pulverized due to the crushing action given to it, and most important of all that there is no swivel action between the binding cables and the ring where the supporting ropes are attached, which results in such a twisting of the binding cables that they soon cut through the tire, or break completely. These defects, and others which are common to similar devices in the art, have been successfully overcome by the present invention, as will be obvious hereinafter.

The present invention is relatively inexpensive to manufacture and may be fabricated from discarded automobile tires. It comprises a stack of tires, bound together by high grade steel cables which are threaded through the tires, the said cables being prevented from tearing through the tires by means of metal grommets inserted in the outside sidewalls of the end tires. Through the use of only three cables, in a triangular arrangement, to bind together the stack of tires, the overall weight of the fender is considerably reduced over similar devices in the art, and at the same time without sacrifice of structural strength.

In the end tires as well as in alternate tires from each end of the stack, there is inserted a triangular shaped, reinforcing truss, composed of thick strips of rubber or similar elastic material, which trusses tend to give the arrangement added structural strength and to aid in resisting deformation, the trusses being mounted in the tires so that the three binding cables pass through the corners of each truss Around the periphery of each of the tires, there is punched a series of holes to permit the drainage of accumulated water, whereby the increase in weight of the device when wet is reduced to a minimum. Other ship's fenders which are familiar to those in the art, are known to increase in weight by from 80 to 100 lbs. when wet, which makes the fender unnecessarily heavy and difficult to remove from the water. Thus, the series of holes in the tires serve the dual purpose of adding to the ease of removing the fender from the water, as well as to destroy the buoyancy of the device so that it may be used below the surface of the water, if so desired.

At each end of the fender of the present invention there is a novel, swivel arrangement, to which the supporting ropes from the ship are attached, the swivel comprising an eye bolt, rotatably mounted inside a sleeve, the three binding cables being attached to the sleeve by means of wire rope sockets. This results in an arrangement whereby the rolling action of the fender along the side of a ship, as the ship moves up and down with the waves, is prevented from twisting the supporting ropes and binding cables to a point where they either break, or cut through the tires, a situation quite common with fenders of the prior art.

With the foregoing features in mind, it is an object of the invention to provide a ship's fender, fabricated from discarded automobile tires, which may be used under water.

Another object of the invention is to provide a ship's fender which will have substantially the same weight when wet as when dry for ease of removal from the water.

An additional object is to provide a system of holes in the tires to facilitate the drainage of accumulated water.

Another object is the provision of a sturdy, light weight, internal structure for the tires so that they tend to resist deformation.

A further object is to provide a non-twisting cable arrangement for binding the tires together thereby reducing the tendency of the cables to cut through the tires.

A still further object is to reduce the weight of the fender to a minimum by limiting the number of necessary binding cables.

Other objects and many of the attendant advantages of this invention will be readily appreciated as the same becomes better understood by reference to the following detailed description when considered in connection with the accompanying drawings wherein.

Figure 1:
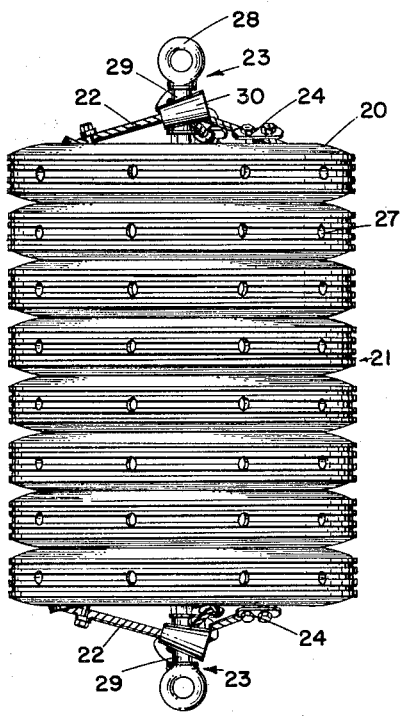
Fig. 1 shows a view in elevation of a preferred embodiment of the invention.

Referring now to the drawings, wherein like reference characters designate like or corresponding parts throughout the several views, there is shown in Fig. 1 the preferred embodiment of the invention, wherein the annular, resilient, ring-like members 20 are placed one upon the other to form a stack 21, these annular resilient members 20 consisting of new or discarded automobile tires, or the like, or may even be especially constructed ring-like sections. The stack 21 is formed by binding together the members 20 by means of the steel cables 22, it having been found that the most advantageous number of annular rings which should be employed is eight, as this number affords ample protection to a ship and at the same time maintains the overall weight of the device at a minimum. The swivels 23 at each end of the stack are utilized for attaching the supporting ropes whereby the fender is suspended over the side of a ship.

The binding cables 22 are composed of three cables spaced substantially equidistantly 120° apart but not necessarily so, and are threaded transversely through each of the annular members 20 and terminate at each end of the stack in a swivel 23. Each cable has fastened to it, at the point where it emerges from the ends of the stack, a cable clamp 24, which not only serves to keep the tires firmly stacked and uniformly shaped, but at the same time prevents the cables from moving back and forth through the tires, thereby eliminating the sawing action which eventually would cut the tires. Further protection against any sawing action by the binding cables is afforded by the metal grommets 25 which are set into the end tires, where the cable traverses the stack. The use of only three binding cables, instead of a larger number, as is employed by similar devices in the art, has the additional advantage of helping to keep the overall weight to a minimum.

Figure 2:
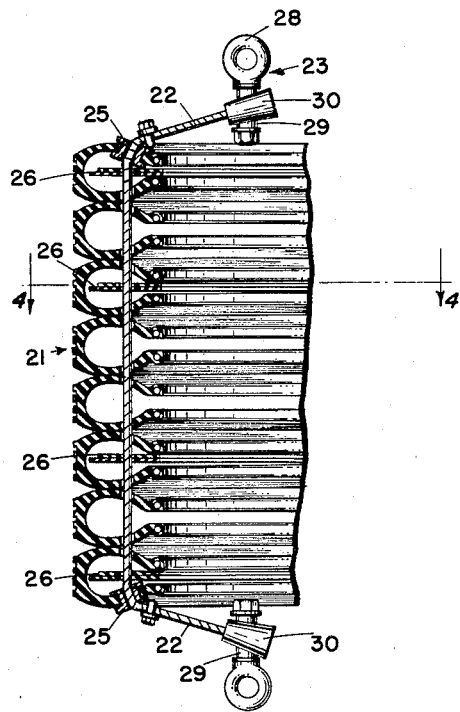
Fig. 2 shows a sectional view in elevation of a portion of the invention.
Figure 3:
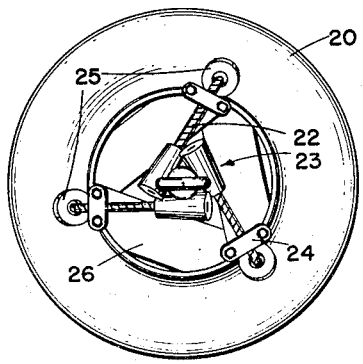
Fig. 3 illustrates a top plan view.
Figure 4:
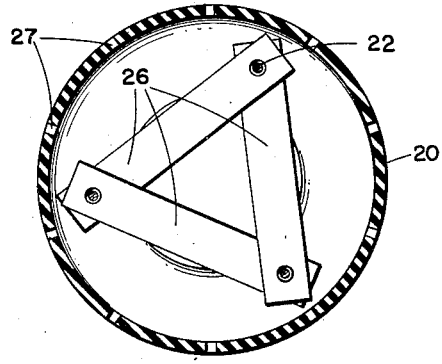
Fig. 4 shows a sectional view taken along the line 4—4 of Figure 2, looking in the direction of the arrows.

Referring now to Figs. 2 and 4, there is shown therein a plurality of reinforcing strips 26 mounted in the stack, the reinforcing strips being composed of a flexible material as rubber, belting, multi-ply canvas, or the like, and being so arranged as to form a number of spaced triangular shaped trusses held together and to the annular members 20 by the cables 22 threaded through apertures in the ends of the reinforcing strips 26 as shown. It is well known that a triangular shaped truss offers a tremendous amount of resistance to distortion, since at least one member will always be in tension, thereby preventing the deformation of the annular member 20 into elliptical shapes regardless of the direction from which the external force is applied to stack 21. In the tires at each end of the stack 21 and in alternate tires from each end thereof, there is placed one of these triangular shaped trusses, each corner of the truss being threaded on one of the binding cables as clearly shown in Figure 2. A ship's bumper is subjected to a tremendous crushing and deforming force between the ship's side and a pier, which naturally tends to mash the bumper out of shape, but through the utilization of reinforcing trusses of the type described such deformation has been substantially eliminated.

Spaced around the periphery of each of the tires 20 are placed a series of holes 27, which allow water to enter, and to drain out of the tires when the bumper is withdrawn from the water. The holes 27 serve two very useful purposes and tend to avoid serious weaknesses which exist in similar devices known to the art. Previously known ship's bumpers have been chiefly constructed of some buoyant material, with the result that they must always be used above water. Such undesirable buoyancy has been eliminated by allowing water to enter the tires through the holes 27, and in so doing have vastly increased the usefulness of the present bumper since it can now be utilized below the waterline as well as above. Another weakness of old type bumpers is that they soon absorb a great quantity of water, and thus become so heavy, that hoisting machinery may be required to move them from the water. The holes 27 allow any collected water to drain out, greatly facilitating removal of the fender from the water.

Figure 5:
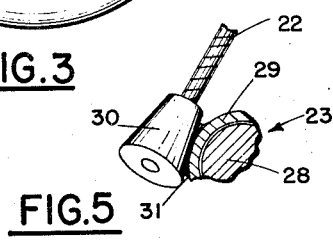
Fig. 5 is a partial section showing a cable socket and the manner in which it is welded to the swivel sleeve.

Figure 5 shows a partial section of one of the swivels 23, and the manner in which the binding cables 22 are anchored thereto. Each swivel is composed of an eye bolt 28, over the shank of which there is revolvably mounted a sleeve 29, the binding cables 22 terminating in cable sockets 30, which are welded, or the like as at 31, tangentially to the sleeve 29 and preferably at a slight angle with the longitudinal axis of the sleeve. With this arrangement, it can be clearly seen that the binding cables 22 do not cross the ends of the stack 21 and do not pass through the longitudinal axis of the stack, this eccentric mounting achieving a certain resiliency by providing for a small amount of rotation of the sleeve 29 with respect to the bolt 28 with a consequent effective lengthening of cables 22 when the attacing rope passing through the eye of bolt 28 is tightened to too great an extent. The eye bolts 28 are used for attaching ropes to the fender in order that it may be lowered over the side of a ship, the swivel arrangement allowing the device to roll up and down along the ship's side as it rises with the waves, while still preventing the supporting ropes and cables from becoming twisted which causes cutting of the tires or breaking of the cables.

Figure 7:
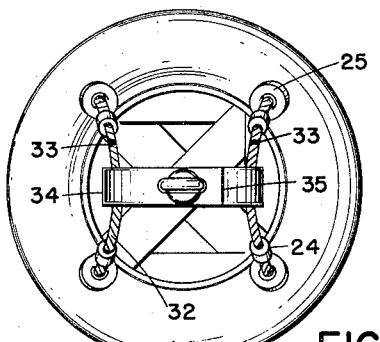
Fig. 7 shows a top plan view of the modified form of the invention.
Figure 8:
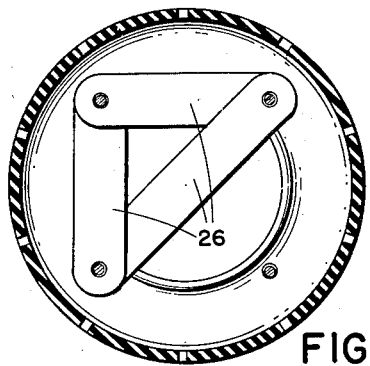
Fig. 8 is a sectional view taken along the line 8—8 of Fig. 6 showing the reinforcing strips.
Figure 6:
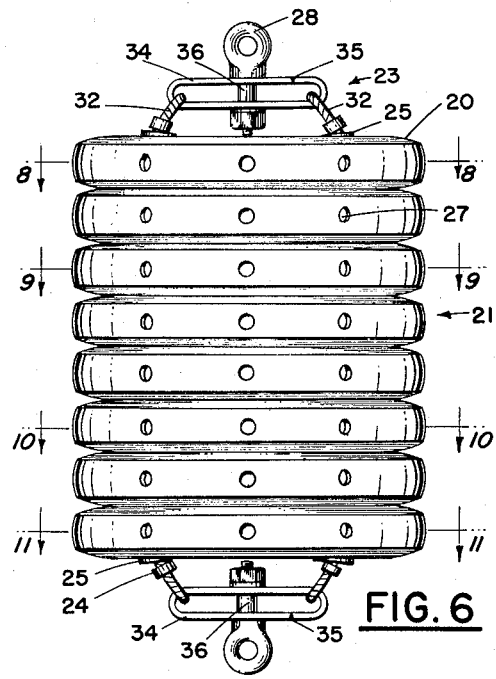
Fig. 6 shows an elevation view of a modified form of the invention, utilizing a different method of binding the tires into a stack, and with a different swivel arrangement.
Figure 9:
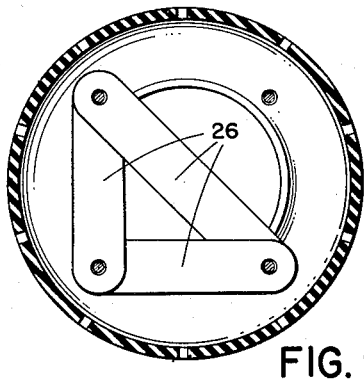
Fig. 9 is a sectional view taken along the line 9—9 of Fig. 6.
Figure 10:
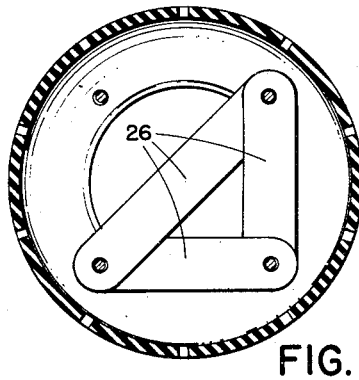
Fig. 10 is a sectional view taken along the line 10—10 of Fig. 6.
Figure 11:
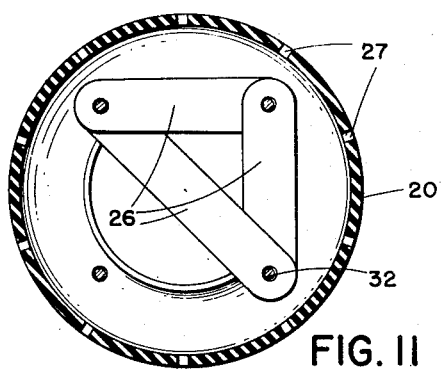
Fig. 11 is a sectional view taken along the line 11—11 of Fig. 6.

Figures 6 and 7 show a modification of the invention, wherein a different method of binding the tires together is employed along with a different swivel. The annular rings 20 are the same as before, and consist of old or new automobile tires, or the like, provided with a series of holes 27 made around their periphery. The binding cables 32 are formed of two complete closed loops of cable, which are spliced together at 33, each loop forming two cables which are threaded transversely through each of the tires 20. This results in four transverse cables instead of three as shown in the first embodiment, each of the cables having clamps 24 where they emerge from the stack, to keep the tires bound together tightly, and to prevent the cables from sawing back and forth through the tires.

A different swivel arrangement is employed in this modification of the invention, wherein a piece of steel plate forming a strap 34 between the two cable loops 32 is used, the plate being preferably welded or otherwise fastened together after assembly, as at 35. The strap 34 is held apart by a pipe spacer 36, and through a hole in the strap and the spacer, there is placed an eye bolt 28 with a washer, nut, and cotter pin, not shown, the tension on the nut being such as to permit the eye bolt 28 to turn freely in the strap 34. This arrangement results in a simple but effective swivel which allows the fender to roll along the side of a ship without twisting the supporting ropes and breaking the binding cables.

Figures 8, 9, 10, and 11 illustrate the way in which the triangular shaped trusses, formed by the resilient, reinforcing strips 26, are mounted throughout the stack of tires. These reinforcing trusses are placed in the end, and in alternate tires from the ends of the stack, as before, but are arranged so that the corners of the truss are threaded on any three of the four transverse binding cables, each truss progressively making use of a different series of cables than the truss immediately preceding it. This gives the fender considerable resistance to deformation throughout its entire length as, no matter from which direction a force is applied to the stack, at least one of the strips 26 will directly resist deformation thereof.

While the strips 26 are shown arranged in the form of triangles within certain ones of the tires, it is obvious that the same or satisfactory results may be achieved by arranging such triangles within each of the tires, or between all of the tires or certain ones thereof. Furthermore, it is clear that each individual strip of each triangle may be placed within and/or between successive tires, or any arrangement thereof may be employed which will provide a series of complete reinforcing triangles throughout the stack. A not as satisfactory arrangement may be applied to the modification of Fig. 6 wherein chords passing between diametrically opposite cables are employed to form cross-like truss members throughout the stack and it is obvious that further reinforcing strips may be placed between and threaded upon adjacent cables if such an arrangement is desired. The reinforcing strips need not be made individually but may be punched in the form of integral triangles or cross-members from a large sheet of the particular material employed.

While the apertures 27 are shown as being in the outer periphery of the tires, it is obvious that they may be punched or cut into the sidewalls or in both the sidewalls and tread of the tires without adversely affecting the results obtained as long as flow of water therethrough is unhampered.

Referring to the drawings and the preceding description, it will be seen that there is provided a boat fender having many novel features and advantages. For example, there is provided a ship's fender which may be fabricated from discarded automobile tires; one which is relatively light in weight since its cables and structure have been kept at a minimum; one which resists deformation due to its sturdy, light weight, internal bracing; one which will not become watersoaked and may be used below the water as well as above; and one which is provided with a non-twisting cable arrangement for binding the tires together so as to reduce the tendency of the cables to cut through the tires or to break completely.

It should be understood, of course, that the foregoing disclosure relates only to preferred embodiments of the invention and that numerous modifications or alternations may be made therein without departing from the spirit and the scope of the invention as set forth in the appended claims.

The invention described herein may be manufactured and used by or for the Government of the United States of America for governmental purposes without payment of any royalties thereon or therefor.

Having thus described the invention, what is claimed is:

1. A rubber boat fender comprising a plurality of hollow toroidal members placed one adjacent the other, said members being made of a material having a specific gravity greater than one, means for binding said hollow toroidal members to form a stack, resilient reinforcing strips spaced throughout said stack in more than two parallel planes, said strips being placed so as to form chords across certain ones of the toroidal members, a series of apertures spaced around each of the said hollow members to permit the free entrance and removal of water from the hollow members whereby the said fender will not be buoyant and may be used below the water.

2. A boat fender comprising a stack of annular, ring-like members, means for binding said annular members together, said binding means including three cables spaced apart and threaded transversely through each of the annular members, a swivel comprising a bolt and an external sleeve associated with said cables at each end of the stack, said cables partially crossing the ends of the stack and terminating at and being so joined to said external sleeve at points displaced from the longitudinal axis of the swivel as to produce rotations of the sleeve about the bolt in one direction when a force is applied to the swivel.

3. A boat fender comprising a stack of hollow toroidal resilient, members, binding means for holding the stack together, said binding means including three cables spaced apart and threaded transversely through each of the members, flexible reinforcing strips in the form of a triangular shaped truss inserted in a plurality of said members, the said three binding cables passing through the corners of each of the trusses.

4. A rubber boat fender comprising a plurality of resilient, hollow toroidal members disposed one adjacent the other, means for binding said members to form a stack, a series of holes spaced substantially around the periphery of each of the said members to permit the entrance and removal of water from said members, the said binding means including three cables spaced apart and threaded transversely through each of the members, flexible reinforcing strips in the form of triangular trusses inserted in a plurality of the members, a swivel comprising a bolt and an external sleeve associated with the said binding cables at each end of the stack, said binding cables passing through the corners of each of the aforementioned trusses, and partially crossing the ends of the stack and terminating at and being so joined to said external sleeve at points displaced from the longitudinal axis of the swivel as to produce rotation of the sleeve about the bolt in one direction when a force is applied to the swivel.

5. A rubber boat fender comprising a plurality of annular members, means for binding said annular members to form a stack, a series of holes spaced substantially around the periphery of each of the annular members to permit the entrance and removal of water from said members, flexible reinforcing strips formed into triangular shaped trusses and placed within certain of the annular members, a swivel associated with the binding means at each end of the stack, said binding means including continuous loops of cable threaded transversely through each of the annular members so as to form a plurality of transverse binding cables, the aforementioned reinforcing trusses being threaded on any three of the transverse binding cables, and the said binding cables being attached to the aforesaid swivel means as they emerge from the ends of the stack.

6. A boat fender comprising a plurality of annular, ring-like members disposed one adjacent the other to form a stack, binding means to hold the stack together, said binding means including continuous loops of cable threaded transversely through each of the annular members so as to form a plurality of transverse binding cables, flexible reinforcing strips forming triangular trusses placed in a plurality of said annular members, said reinforcing trusses being threaded on any three of the transverse binding cables, each succeeding truss utilizing a different series of transverse binding cables than the preceding truss, a swivel associated with the binding cables at each end of the stack and attached to the said binding cables as they emerge from the ends of the stack.

7. A boat fender comprising a plurality of hollow toroidal resilient members disposed one adjacent the other, means for binding said hollow toroidal members into a stack, the last said means including three or more spaced apart cables each threaded transversely through the hollow portions of said members, and a plurality of resilient reinforcing strips threaded upon said cables to form chords across certain ones of said hollow toroidal members, said strips being spaced throughout said stack in more than two parallel planes.

8. The boat fender of claim 7 wherein said binding means includes an attaching member at each end of said stack, said cables terminating at and being joined to said attaching member at points displaced from the longitudinal axis thereof to produce rotation of the attaching member in one direction when a force is applied thereto.

GEORGE SIPKIN.
EARL B. AMEY.

REFERENCES CITED

The following references are of record in the file of this patent:

UNITED STATES PATENTS

| Number | Name | Date |
| --- | --- | --- |
| Re. 18,672 | Lyons | Nov. 29, 1932 |
| 68,251 | Sniffin | Aug. 27, 1867 |
| 2,413,210 | Blackman | Dec. 24, 1946 |
| 2,426,345 | Dosker | Aug. 26, 1947 |